US008257587B2

(12) United States Patent
Angus et al.

(10) Patent No.: US 8,257,587 B2
(45) Date of Patent: Sep. 4, 2012

(54) CENTRIFUGAL SCROLL SCREEN APPARATUS

(75) Inventors: Robert Bruce Angus, Dutton Park (AU); Michael Trench, Warner (AU); Maurice Ross Munro, Raby Bay (AU); Stephen Thomas Wilmot, Gordon Park (AU); Stephen John Walsh, Bald Hills (AU); Terrance Shane McLoughlin, Adamstown (AU)

(73) Assignee: Ludowici Australia Pty. Ltd., Pinkenba (AU)

( * ) Notice: Subject to any disclaimer, the term of this patent is extended or adjusted under 35 U.S.C. 154(b) by 468 days.

(21) Appl. No.: 12/594,283

(22) PCT Filed: Apr. 5, 2007

(86) PCT No.: PCT/AU2007/000462

§ 371 (c)(1), (2), (4) Date: Nov. 13, 2009

(87) PCT Pub. No.: WO2008/122067

PCT Pub. Date: Oct. 16, 2008

(65) Prior Publication Data

US 2010/0120598 A1 May 13, 2010

(51) Int. Cl.

*B04B 3/00* (2006.01)
*B04B 7/16* (2006.01)
*B01D 33/46* (2006.01)
*B01D 33/76* (2006.01)

(52) U.S. Cl. ..................... 210/232; 210/360.1; 210/374; 210/380.3; 494/36

(58) Field of Classification Search .................. 210/232, 210/360.1, 374, 380.3; 494/36
See application file for complete search history.

(56) References Cited

U.S. PATENT DOCUMENTS

| | | | |
|---|---|---|---|
| 4,009,823 | A | 3/1977 | Nozdrovsky |
| 6,736,968 | B2 | 5/2004 | Mullins et al. |
| 6,869,389 | B2 | 3/2005 | Mackel et al. |

FOREIGN PATENT DOCUMENTS

| | | | |
|---|---|---|---|
| WO | 94/06536 | A1 | 3/1994 |
| WO | WO 2008122067 | A1 * | 10/2008 |

OTHER PUBLICATIONS

International Preliminary Report on Patentability for PCT/AU2007/000462, Jan. 2009.*
International Search Report , Jun. 11, 2007.

* cited by examiner

*Primary Examiner* — David A Reifsnyder
(74) *Attorney, Agent, or Firm* — Howard & Howard Attorneys PLLC

(57) ABSTRACT

A horizontal centrifugal scroll screen apparatus including: a housing; a frusto-conical screen assembly mounted within the housing and having an outer inlet end and an inner discharge end, the screen assembly being mounted for driven rotation via a base-of-spoke piece disposed across the inner discharge end thereof; and a frusto-conical scroll assembly coaxially mounted for differential driven rotation within the screen assembly and including an outer closed end in the proximity of the outer inlet end of the screen assembly and being adapted to direct material to be screened from a material supply conduit to the outer inlet end of the screen assembly for screening and conveyance to an outlet provided in the base-of-spoke piece.

33 Claims, 6 Drawing Sheets

FIGURE 4D
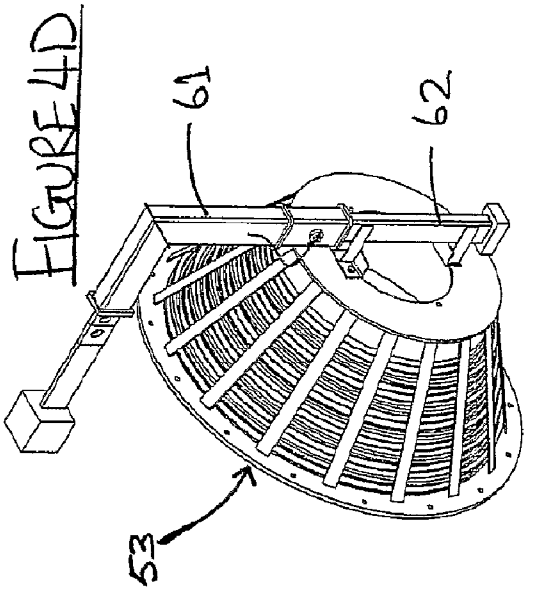
FIGURE 4C
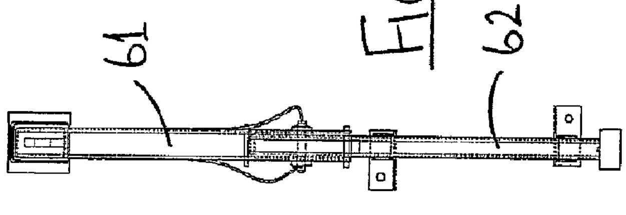
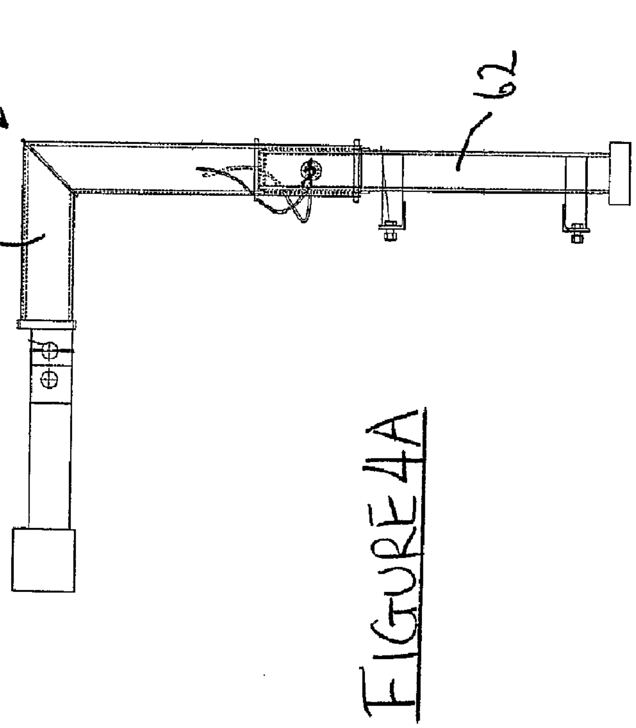
FIGURE 4A
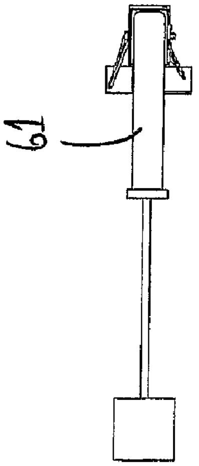
FIGURE 4B

CENTRIFUGAL SCROLL SCREEN APPARATUS

FIELD OF THE INVENTION

This invention relates to a centrifugal scroll screen apparatus. This invention, according to various embodiments, has particular application to horizontal centrifuges, more particularly horizontal fine-coal centrifuges, and for illustrative purposes the invention will be described with reference to this application. However it is envisaged that this invention according to other embodiments may find use in other applications such as centrifugal scroll screens generally.

BACKGROUND OF THE INVENTION

The reference to any prior art in this specification is not, and should not be taken as, an acknowledgement or any form of suggestion that the referenced prior art forms part of the common general knowledge in Australia.

Centrifugal scroll screens for dewatering of fine coal are used in a continuous process mandated by the volume demands of processes such as PCI, fluidized bed and other continuous end uses for fine coal. The general principle upon which all such screens operate is that a concentric-shaft drive assembly is used to differentially drive a frusto-conical screen assembly and a scroll assembly having one or more substantially helical scrapers within a housing.

The frusto-conical screen assembly includes a driven base (termed a "base-of-spoke piece") closing its inner, narrow end and a screening surface formed by hoops and stringers supporting wedge wire or other screening surface-forming material. The scroll assembly typically comprises a generally frusto-conical scroll body having the one or more substantially helical scrapers fabricated thereto and having a drive flange running substantially adjacent the base-of-spoke piece.

Material to be screened is deposited by a conduit into the narrow end of the scroll body, which is provided with delivery apertures allowing the material to pass radially to the screening surface. The scroll assembly and screen assembly rotate at different speeds whereby material deposited centrifugally on the screen is urged by the relative scraping action of the scrapers on the screening surface to urge the deposited material toward the larger, discharge end of the screening assembly. The speed differential may be selected to either advance or retard the rate of flow of screened material through the apparatus, depending on the characteristics of the material being screened. The number and helical length of the scraper or scrapers may also be selected having regard to the dynamic nature of the material being screened.

U.S. Pat. No. 6,736,968 describes a typical prior art apparatus. In its fundamental particulars a horizontal centrifuge has a frusto-conical basket rotatably mounted within a housing. The basket has a plurality of rings disposed between an open, wider end and a closed, narrower end of the basket and a plurality of guide rails circumferentially spaced with respect to the rings. The guide rails have respective lengths extending between the open and the closed ends of the basket and provide a plurality of respective bearing surfaces. A tubular (frusto-conical) screen is supported in the basket by the plurality of bearing surfaces of the guide rails. A scroll with helical screw flights is also rotatably mounted within the basket. The scroll may be inserted or removed through the wide end. The tubular screen is made from six arcuate screen segments. The bearing surfaces of the guide rods and the peripheral edges of the helical screw flights are machined surfaces of otherwise simply-fabricated components. An infeed tube has an outlet extending through the outer end of the scroll and extending through the scroll body, the material passing through apertures in the scroll body wall between the helical screw flights to deposit material at the narrower driven end of the screen.

The use of six arcuate panels permits field change out by an integrated hoist system, whereby the opened housing may first have the scroll assembly changed out, followed by an outer hoop of the basket and the arcuate panels in turn. The basket may remain in the machine, have arcuate panels refitted, and forced to roundness and retained, before refitting the scroll assembly.

While this can be said to have certain advantages over the prior art, in terms of the use of lighter and cheaper fabricated components and a multipart screen surface capable of being changed out apart from the basket, it remains that there are fundamental issues of construction to address.

Firstly, the use of multipart screen sections requires high tolerance construction and requires that great attention be paid to maintaining roundness and concentricity of the screen surface on installation. Despite the assertion that using six arcuate segments provides the screen with greater circularity and allows the screen to better conform to the bearing surfaces on the guide rails, thereby making the screen more concentric with the basket and the scroll, the key issue is whether the screening surface is concentric and sized to the surface of the solid of rotation of the scroll assembly. The use of the retaining ring or clamp ring to urge the screen against the bearing surfaces, which is alleged to help maintain the roundness of the screen, instead is a high tolerance piece which is essential. The bearing surfaces of the guide rods and the peripheral edges of the helical screw flights must also be machined surfaces to provide this concentricity between the scroll and the screen, rather than being optional as implied.

Secondly, there is an inherent reduction in effective path length through having to pass the conduit into the narrow base of the scroll assembly. This actually occurs while the product flow is forced to change direction twice to output.

SUMMARY OF THE INVENTION

In one aspect the present invention resides broadly in a horizontal centrifugal scroll screen including:

- a housing;
- a frusto-conical screen assembly mounted within the housing and having an outer inlet end and an inner discharge end, the screen assembly being mounted for driven rotation via a base-of-spoke piece disposed across it's the inner discharge end thereof; and
- a frusto-conical scroll assembly coaxially mounted for differential driven rotation within the screen assembly and including an outer closed end in the proximity of the outer inlet end of the screen assembly and being adapted to direct material to be screened from a material supply conduit to the outer inlet end of the screen assembly for screening and conveyance to an outlet provided in the base-of-spoke piece.

The apparatus mentioned above may advantageously facilitate the sequential removal of the screen assembly and the scroll assembly, as will be described in more detail below. This provides for the removal of the screen assembly without the need for removal of the scroll assembly which is advantageous when one considers the effective wear on these components, as will also be dealt with in more detail below.

The housing may be divided into a working chamber and a discharge chamber, the two chambers being divided by a wall.

The wall may comprise an annulus within which rotates the drive base-of-spoke piece. The base-of-spoke piece and annulus may be provided with complementary flange portions adapted to reduce passage of screened product from the discharge chamber to the working chamber, and filtrate from the working chamber to the discharge chamber.

The housing preferably includes a front wall adapted to close the housing, the front wall supporting the material supply conduit through an aperture located in the front wall. The front wall is preferably hinged, or may be otherwise supported, to be opened to provide sequential access to the screen assembly and scroll assembly. The housing and the front wall are more preferably configured such that the screen assembly and scroll assembly can be withdrawn through an opening closed by the front wall.

The screen assembly and scroll assembly may be driven by respective drive means. Preferably, the respective assemblies are driven by a unitary drive assembly. The drive assembly may comprise a motor and gearbox arrangement having differentially-rotated, inner and outer concentric drive shafts. Alternatively the differential rotation of concentric shafts may be by use of a cyclodrive. The inner shaft may drive the scroll assembly. The outer shaft may drive the base-of-spoke piece. The differential rotation may be fixed or variable. Where the differential rotation is variable, the differential rotation may be variable and adjustable over a range selected to be either side of, or about the point where, the rotational speeds of the screen assembly and scroll assembly are equal. The housing may be integrated with a mounting for the drive assembly.

The base-of-spoke piece may be formed of cast iron or steel, or may be fabricated. The base-of-spoke piece may be formed with an annular lip, disposed in close proximity to an inner edge of the scroll assembly, that reduces the bypass of screened material into the scroll assembly.

The screen assembly may include a screen support comprising annular hoops interconnected by stringers located in axial planes of the screen assembly. That is, in axial planes of the frusta-conical form. An inner hoop of the annular hoops of the screen support may be adapted to be releasably secured to the base-of-spoke piece by any suitable securing means, such as by bolting. The inner hoop may extend laterally outward of the screen assembly to overlay a corresponding portion of the base-of-spoke piece, enabling the bolts to be accessible once the housing is opened. The bolts may pass into tapped holes in the base-of-spoke piece to enable the bolts to be removed without accessing the back of the base-of-spoke piece.

A screening surface of the screen assembly may be fabricated to the screen support, generally from a screen stock, such as by wedge wire ERC welding, or may be otherwise affixed directly to the stringers. The screen support may also be fabricated into panels to bolt up or be otherwise secured into the screen support.

The outer inlet end, which constitutes a narrower feed end, of the screen assembly may include a containment band confining the material to be screened to an area swept by the scroll assembly.

The scroll assembly may be cast or fabricated. For lightness and cost reasons, the scroll assembly is generally fabricated. The scroll assembly may be formed as a generally hollow, frusto-conical scroll body. A plurality of scroll flutes will generally be provided on the scroll body. The scroll flutes may be of any suitable number and pitch. For example for fine coal treatment the scroll body will generally include about 4 to 6 flutes of about ¼ rotation pitch. The flutes may be fabricated to the scroll body by welding and may optionally be finished to the screen surface profile by machining or grinding. Alternatively, the flutes may be cast and machined and retained to the body by any suitable means.

The outer closed end of the scroll assembly may include a dish or at least part conical recess set into the outer closed end of the scroll assembly. Alternatively, the outer closed end may be substantially flat.

The outer closed end of the scroll assembly may be annular and welded about its annulus to an axial sleeve extending from a transverse drive web welded within the scroll assembly to maintain the alignment of the scroll assembly over an extended length. The transverse drive web may be provided with an annular bearing adapted to allow the scroll assembly to idle on an annular and axially-directed bearing surface formed on the base-of-spoke piece, a shaft drive of the scroll assembly extending through the axial sleeve. Drive for the scroll assembly may be transmitted from a shaft by a drive cap accessible from a feed side of the outer closed end to enable release of the scroll assembly from the feed side, or may comprise a splined drive between the shaft and axial sleeve, and retained by a plate and central bolt or circular bolt array threaded into the shaft end.

The wear components of the apparatus include the outer inlet end of the screen assembly, the outer closed end of the scroll assembly, the scraping edges of scroll flutes on the scroll body, the screen surface of the screen assembly and the base-of-spoke piece, particularly about the material outlets. Of these, the scroll assembly and the screen surface portion of the screen assembly most frequently require maintenance.

In a preferred embodiment, the outer closed end of the scroll assembly is configured to direct material to be screened from the material supply inlet to the outer inlet end of the screening assembly for screening. More particularly, in order to bring the speed of the feed material entering the apparatus to the speed of the internal components, particularly the screen assembly, accelerator vanes are preferably located on the scroll assembly adjacent its outer closed end to accelerate and direct material to be screened from the material supply conduit to a screening surface of the screening assembly. Such a distributing feature has been found to provide advantages over prior art scroll screen apparatus in general.

Accordingly, in another aspect of the invention there is provided a centrifugal scroll screen apparatus including:

a housing;

a frusto-conical screen assembly mounted within the housing and having an inlet end and an discharge end, the screen assembly being mounted for driven rotation via a base-of-spoke piece disposed across the discharge end thereof;

a frusta-conical scroll assembly coaxially mounted for differential driven rotation within the screen assembly and including a closed end in the proximity of the inlet end of the screen assembly and being adapted to direct material to be screened from a material supply conduit to the inlet end of the screen assembly for screening and conveyance to an outlet provided in the base-of-spoke piece; and a distributor located on the closed end of the scroll assembly and being configured to direct material to be screened from the material supply inlet to the inlet end of the screening assembly for screening.

As will be appreciated from the above discussion, in a preferred embodiment the distributor includes accelerator vanes located on the scroll assembly adjacent its closed end to accelerate and direct material to be screened from the material supply conduit to a screening surface of the screening assembly.

The centrifugal scroll screen assembly according to this aspect of the invention is not necessarily limited to a horizontal-type assembly. Nevertheless, according to embodiments of this aspect of the invention, the inlet end and discharge end of the screen assembly respectively constitute an outer end and inner end of the screen assembly, and the closed end of the scroll assembly that is in the proximity of the inlet end of the screen assembly constitutes an outer end of the scroll assembly.

As was the case in the previously described aspect of the invention, the housing preferably includes a front wall adapted to close the housing, the front wall supporting the material supply conduit through an aperture located in the front wall. Again, the front wall is preferably hinged to provide sequential access to the screen assembly and scroll assembly, and preferably the housing and the front wall are configured such that the screen assembly and scroll assembly can be withdrawn through an opening closed by the front wall.

Other embodiments and features of this aspect of the invention may likewise be gleaned from the discussion of the previous aspect of the invention.

In the present invention, the apparatus may be associated with self changing gear. For example there may be provided a change out hoist mounted on the apparatus and adapted to engage various components for change out.

In apparatus according to preferred embodiments of the present invention, the material supply conduit and front wall of the housing may be opened to expose the screen assembly. An integrated hoist may be fitted with an adapter to bolt to corresponding threaded apertures in an outer hoop of the screen assembly. The bolts securing an inner hoop of the screen assembly to the base-of-spoke piece may then be released and the screen assembly withdrawn. Thereafter the drive cap may be unbolted from the inner shaft end and sleeve end to permit the hoist to be adapted to the sleeve end threads and operated to draw the scroll assembly from the housing. The integrated hoist may operate solely through the front opening of the housing. Alternatively, the hoist may operate through a removable access panel on top of the housing to permit direct hoisting over the centre of gravity of the components such as the base-of-spoke piece.

BRIEF DESCRIPTION OF THE DRAWINGS

The invention will be described with reference to the following non-limiting embodiment of the invention as illustrated in the drawings and wherein:

FIG. 4A is a side view of a change-out tool configured to remove the screen assembly of the apparatus of FIGS. 1 and 3;

FIG. 4B is a plan view of the tool of FIG. 4A;

FIG. 4C is a front view of the tool of FIG. 4A;

FIG. 4D is a perspective view of the tool of FIG. 4A in use;

Referring to FIGS. 1 and 2, according to one embodiment there is provided a centrifugal scroll screen apparatus including a housing 10 divided by an annular wall 11 into a water discharge side 12 and a coal discharge side 13. The open front of the housing 10 is closed by a front wall closure 14 hinged at 15 to allow the housing to be selectively opened. The front wall closure 14 includes a feed pipe 16 supported in a central inlet aperture 17 that admits coal slurry to the centrifugal scroll screen apparatus. The housing 10 is supported on mounts 20.

Figure 1:
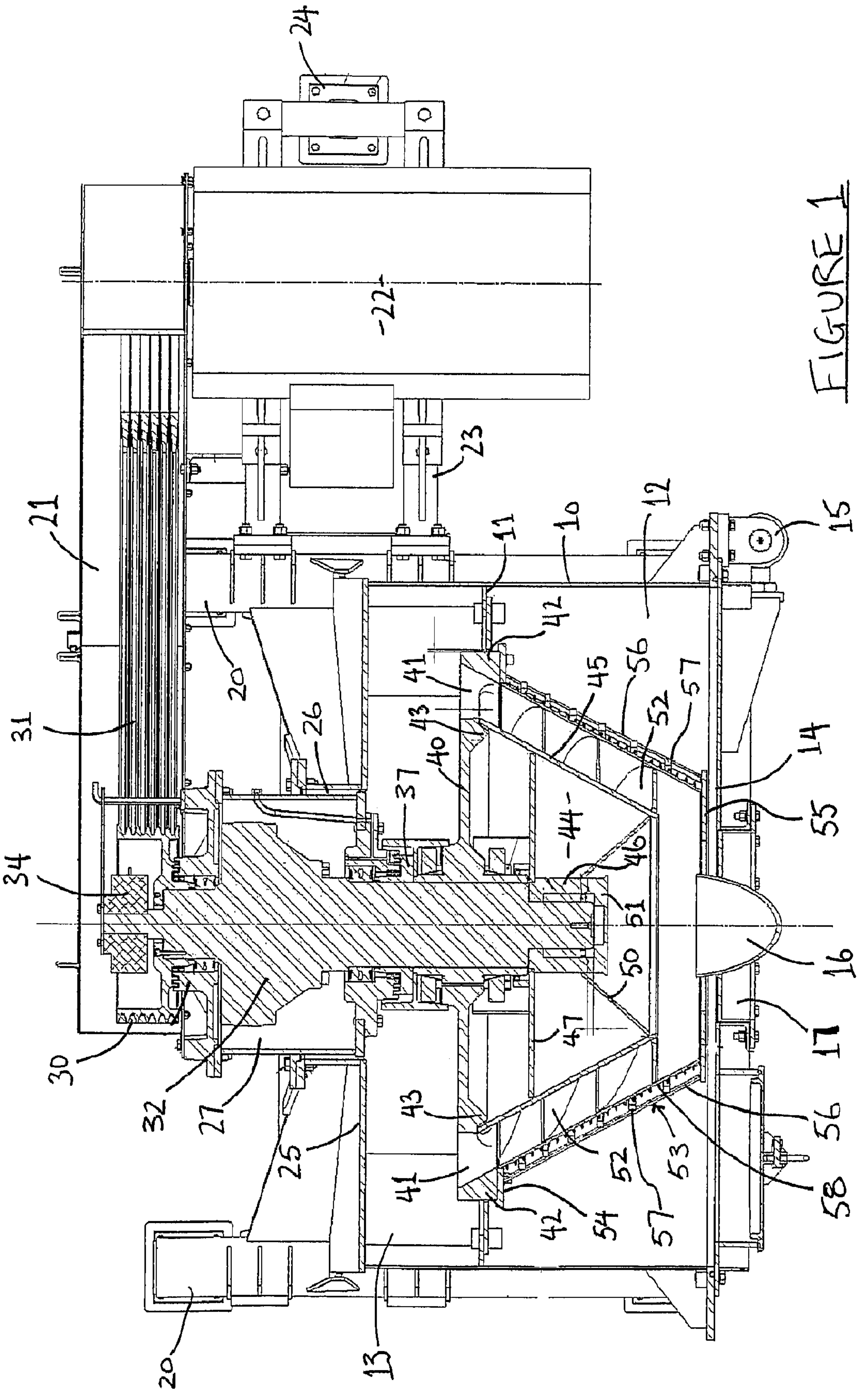
FIG. 1 is a horizontal centre plane section through an apparatus in accordance with an embodiment of the present invention.
Figure 2:
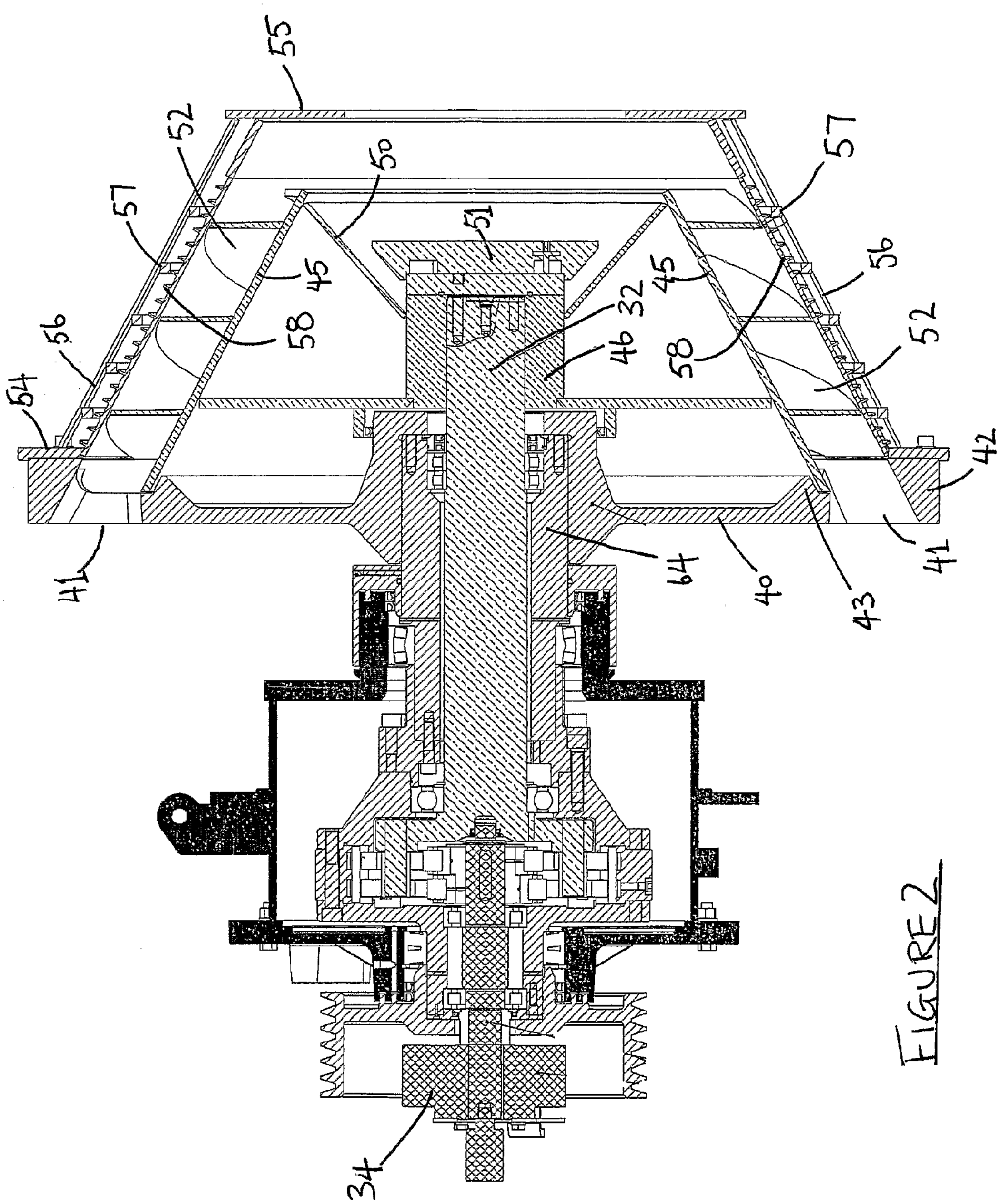
FIG. 2 is a vertical section through the drive and driven components of the apparatus of FIG. 1.

A drive assembly 21 includes an electric motor 22 cantilevered at 23 from the mount 20 and supported outboard on motor mount 24. A rear wall 25 of the housing 10 incorporates a cyclodrive mount and housing 26. A cyclodrive unit 27 includes an input pulley 30 driven by the motor 22 via transmission belt 31. The pulley 30 drives an outer shaft 37 which in turn drives an inner shaft 32 via the cyclodrive unit 27. The cyclodrive unit provides differential rotational speeds for the inner shaft 32 and outer shaft 37. A clutch 34 provides overload protection to the drive.

The outer drive output 37 has mounted thereon a cast steel base-of-spoke piece 40 having a central bore through which the inner shaft 32 passes. The base of spoke piece 40 includes a plurality of discharge apertures 41 located within the periphery 42 of the casting. Within the annulus of periphery 42 is an annular ridge 43. The base-of-spoke piece 40 runs with its periphery 42 within and at a clearance of about five millimeters from the inner edge of the annular wall 11.

A scroll assembly 44 is fabricated from a frustoconical scroll body 45 having an inner transverse drive web 47 welded therein and an outer part conical closed end 50. The scroll assembly 44 is supported for rotation with the inner shaft 32 within the housing 10 by a drive sleeve 46 welded to central apertures provided in both the inner transverse drive web 47 welded therein and the outer part conical closed end 50. The drive sleeve 46 extends through the outer part conical closed end 50 and the scroll assembly 44 is both retained on the inner shaft 32 and coupled to its rotation by securing a drive cap 51. The outer surface of the scroll body 45 supports six welded-on steel scroll flutes 52 of helical form and extending for ¼ revolution in pitch. The flutes 52 are machined to tolerance.

A screen assembly 53 comprises an inner flange 54 and an outer flange 55 interconnected by welded T-stringers 56 formed over a plurality of spaced hoops 57. The inner flange 54 extends laterally out to form a mating annulus with the base-of-spoke piece 40, to which it is bolted. The outer flange extends laterally inward to run at close clearance to the feed pipe 16 to constrain input material to the interior of the basket so formed. A wedge wire screening surface 58 is formed by ERC welding wedge wire circumferentially to the stringers.

Figure 3:
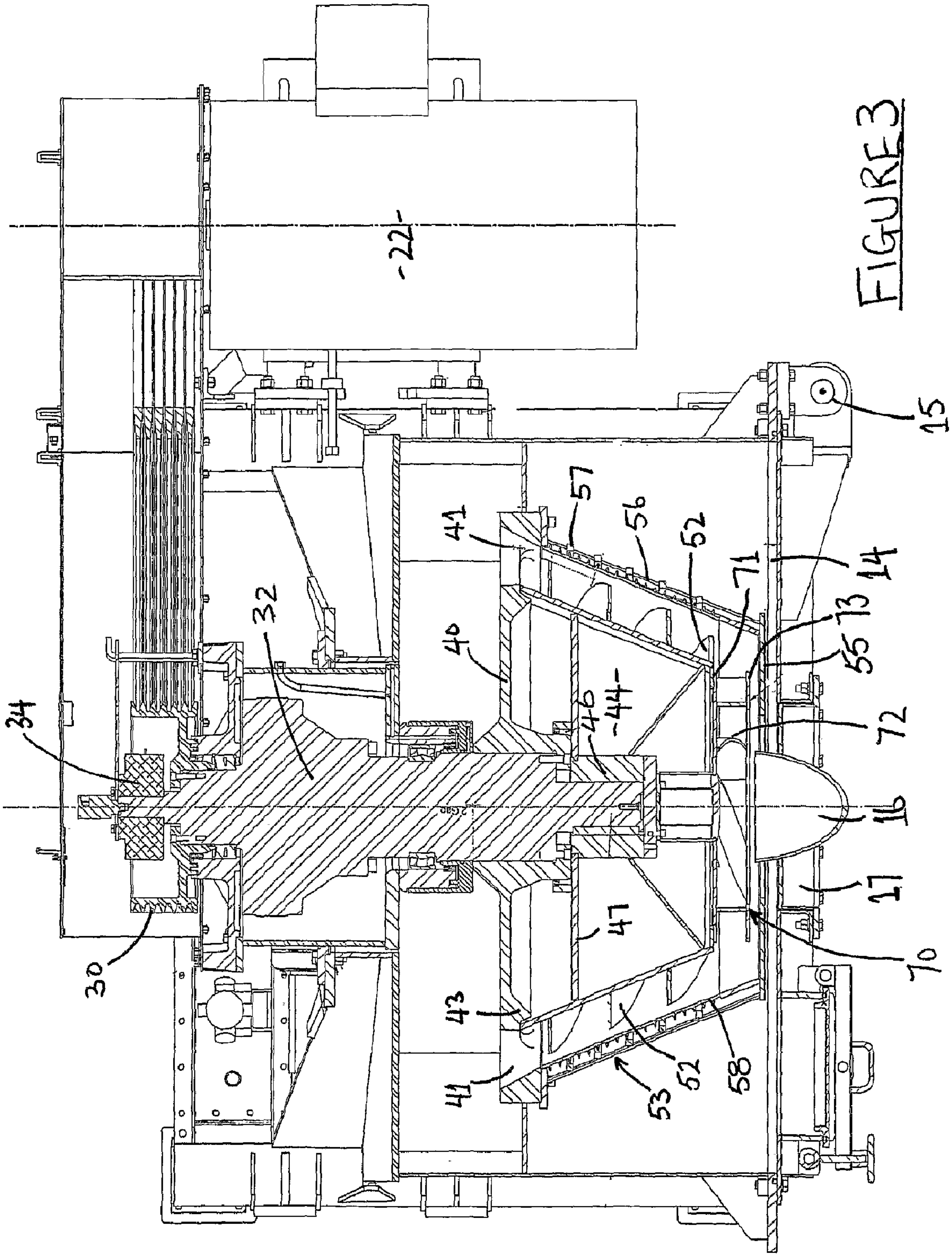
FIG. 3 is a horizontal centre plane section through an apparatus in accordance with another embodiment of the present invention.

An alternative embodiment is illustrated in FIG. 3. According to this embodiment, a distributor 70 is located at the inlet end of the scroll assembly 44. The distributor 70, which may also be coined an accelerator, has the appearance of a pump impeller. It includes a plate 71 mounted on the end of the scroll assembly 44. Radiating accelerator vanes 72 are provided that are designed to accelerate the material feed or inflow closer to the rotational speed of the screen assembly 53. The accelerator vanes may be curved or straight in their configuration. A second plate 73 may be provided on the inlet side of the scroll assembly 44 to enclose the flow of material.

Figure 5D:
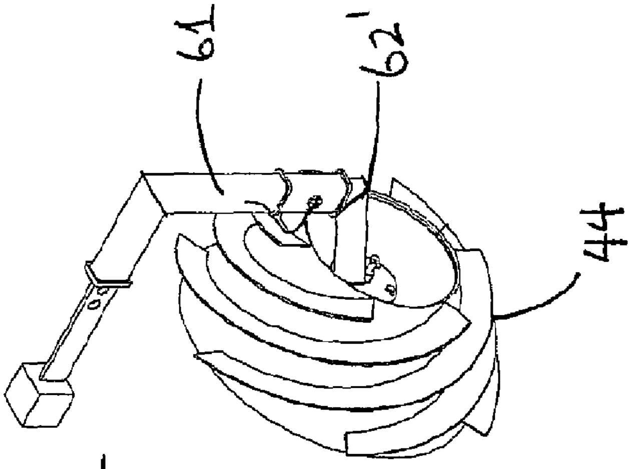
FIG. 5D is a perspective view of the tool of FIG. 5A in use.
Figure 5C:
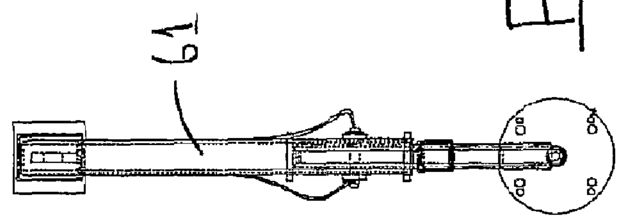
FIG. 5C is a front view of the tool of FIG. 5A.
Figure 5B:
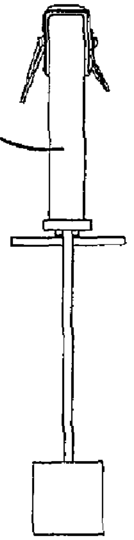
FIG. 5B is a plan view of the tool of FIG. 5A.
Figure 5A:
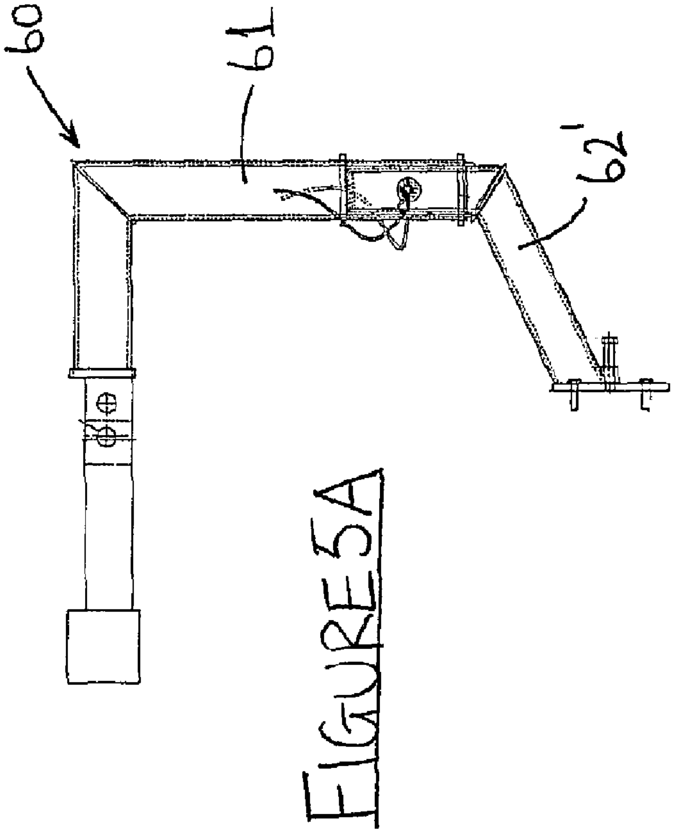
FIG. 5A is a side view of a change-out tool configured to remove the scroll assembly of the apparatus of FIGS. 1 and 3.
Figure 6A:
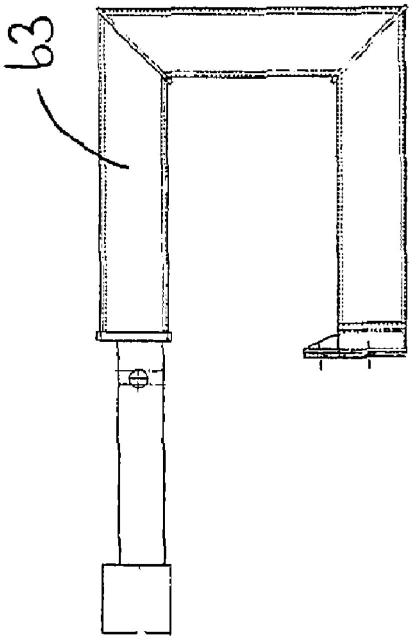
FIG. 6A is a side view of a change-out tool configured to remove the base-of-spoke piece of the apparatus of FIGS. 1 and 3.
Figure 6B:
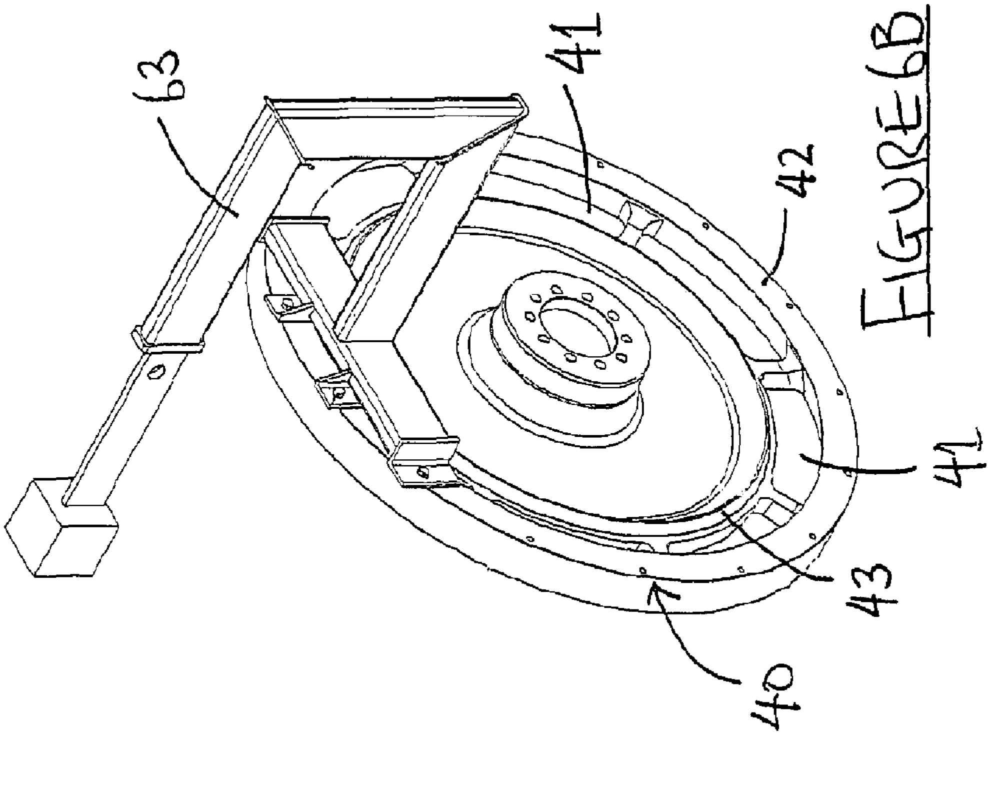
FIG. 6B is a perspective view of the tool of FIG. 6A in use.

The internals of the apparatus and basket assembly are hosed out and rendered free from product and foreign material that will cause interference when removing the components of the apparatus. The front wall closure 14 is opened and a lifting device 60 is secured to the screen assembly using an arm 61 having an attachment 62 as illustrates in FIG. 4D. The bolts securing the screen assembly 53 to the base-of-spoke piece 40 are withdrawn and the screen assembly 53 extracted and lowed by the device 60. The lifting device 60 is then modified by attachment 62' to engage and remove the scroll assembly 44 after the drive cap 51 is released, as illustrated in FIG. 5D. The arm 61 and attachment 62' of the device 60 are then replaced by an extractor 63 which is adapted to bolt up to the base-of-spoke piece 40, using threaded holes previously used for securing the inner flange 54, before the base-of-spoke piece 40 is unbolted from the outer shaft 64 and withdrawn from the housing 10 as illustrated in FIG. 6B.

Apparatus in accordance with the foregoing embodiment may be optimized as to basket angle to be self discharging at normal running speed and feed conditions. The scroll angle may be optimized and the scroll speed (i.e. the fixed ratio of running speed) selected to interact to retard the throughput of fine product. The inverted cone closed end allows the feed to be introduced close to the centre to enable the feed to accelerate up to basket speed with minimal wear and splash. The scroll angle is designed to increase retention time, reduce moistures and maximize throughput once optimized.

The design and orientation the exemplified apparatus provides accessibility to the high wearing components within the water housing. The high wearing parts such as the screen assembly, the scroll assembly and the base-of-spoke piece can be removed in order of their wear life. The screen assembly is expected to be changed out every 4-5 weeks, the scroll assembly is expected to be changed out every 5-6 baskets and the base-of-spoke piece is expected to be changed out every second time the scroll is changed.

This design according to various embodiments of the invention may dramatically reduce screen assembly change out times as the screen assembly can be accessed as soon as the door is opened. In the prior art designs the basket is the last component to be removed, thus producing more down time of the machine due to the removal of additional components that do not need replacing.

The present apparatus may reduce down time in maintenance as the components that are being removed will need to be replaced in the majority of the cases. The component removal has been made easier and faster with innovative designed lifting equipment that can be used to remove each specific component safely.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:

1. A horizontal centrifugal scroll screen apparatus including:

a housing;

a frusto-conical screen assembly mounted within the housing and having an outer inlet end and an inner discharge end, the screen assembly being mounted for driven rotation via a base-of-spoke piece disposed across the inner discharge end thereof; and a frusto-conical scroll assembly coaxially mounted for differential driven rotation within the screen assembly and including an outer closed end in the proximity of the outer inlet end of the screen assembly and being adapted to direct material to be screened from a material supply conduit to the outer inlet end of the screen assembly for screening and conveyance to an outlet provided in the base-of-spoke piece.

2. A horizontal centrifugal scroll screen apparatus according to claim 1, wherein the housing is divided into a working chamber and a discharge chamber, the two chambers being divided by a wall.

3. A horizontal centrifugal scroll screen apparatus according to claim 2, wherein the wall comprises an annulus within which rotates the base-of-spoke piece, and wherein the base-of-spoke piece and annulus are provided with complementary flange portions adapted to reduce passage of screened product from the discharge chamber to the working chamber, and filtrate from the working chamber to the discharge chamber.

4. A horizontal centrifugal scroll screen apparatus according to claim 1, wherein the housing includes a front wall adapted to close the housing, the front wall supporting the material supply conduit through an aperture located in the front wall.

5. A horizontal centrifugal scroll screen apparatus according to claim 4, wherein the front wall is hinged to provide sequential access to the screen assembly and scroll assembly.

6. A horizontal centrifugal scroll screen apparatus according to claim 5, wherein the housing and the front wall are configured such that the screen assembly and scroll assembly can be withdrawn through an opening closed by the front wall.

7. A horizontal centrifugal scroll screen apparatus according to claim 1, wherein the scroll assembly and screen assembly are respectively driven by differentially-rotated, inner and outer concentric drive shafts of a unitary drive assembly.

8. A horizontal centrifugal scroll screen apparatus according to claim 7, wherein the unitary drive assembly comprises a cyclodrive.

9. A horizontal centrifugal scroll screen apparatus according to claim 7, wherein differential rotation is variable and adjustable over a range selected to be either side of, or about the point where, the rotational speeds of the screen assembly and scroll assembly are equal.

10. A horizontal centrifugal scroll screen apparatus according to claim 1, wherein the base-of-spoke piece is formed of cast iron or steel.

11. A horizontal centrifugal scroll screen apparatus according to claim 10, wherein the base-of-spoke piece is formed with an annular lip, disposed in close proximity to an inner edge of the scroll assembly, that reduces the bypass of screened material into the scroll assembly.

12. A horizontal centrifugal scroll screen apparatus according to claim 1, wherein the screen assembly includes a screen support comprising annular hoops interconnected by stringers located in axial planes of the screen assembly.

13. A horizontal centrifugal scroll screen apparatus according to claim 12, wherein an inner hoop of the annular hoops is adapted to be releasably secured to the base-of-spoke piece by securing means.

14. A horizontal centrifugal scroll assembly according to claim 13, wherein the inner hoop is secured to the base-of-spoke piece by bolting it thereto.

15. A horizontal centrifugal scroll screen apparatus according to claim 14, wherein the inner hoop extends laterally outward of the screen assembly to overlay a corresponding portion of the base-of-spoke piece.

16. A horizontal centrifugal scroll screen apparatus according to claim 15, wherein a screening surface of the screen assembly is fabricated to the screen support by wedge wire ERC welding or is otherwise affixed to the stringers.

17. A horizontal centrifugal scroll screen apparatus according to claim 1, wherein the outer inlet end of the screen assembly includes a containment band confining the material to be screened to an area swept by the scroll assembly.

18. A horizontal centrifugal scroll screen apparatus according to claim 1, wherein the scroll assembly is fabricated as a generally hollow, frusto-conical scroll body.

19. A horizontal centrifugal scroll screen apparatus according to claim 18, wherein a plurality of scroll flutes are provided on the scroll body.

20. A horizontal centrifugal scroll screen apparatus according to claim 19, wherein the scroll flutes are welded to the scroll body and finished by machining or grinding.

21. A horizontal centrifugal scroll screen apparatus according to claim 19, wherein the scroll screen apparatus is for fine coal treatment and the scroll body includes from 6 to 8 scroll flutes of about ¼ rotation pitch.

22. A horizontal centrifugal scroll screen apparatus according to claim 1, wherein the outer closed end of the scroll assembly includes a dish or at least part conical recess set into the outer closed end of the scroll assembly or the outer closed end is substantially flat.

23. A horizontal centrifugal scroll screen apparatus according to claim 22, wherein the outer closed end of the scroll assembly is annular and welded about its annulus to an axial sleeve extending from a transverse drive web welded within the scroll assembly to maintain the alignment of the scroll assembly over an extended length.

24. A horizontal centrifugal scroll screen apparatus according to claim 23, wherein the transverse drive web is provided with an annular bearing adapted to allow the scroll assembly to idle on an annular and axially directed bearing surface formed on the base-of-spoke piece, a shaft driving the scroll assembly extending through the axial sleeve.

25. A horizontal centrifugal scroll screen apparatus according to claim 23, wherein drive for the scroll assembly is transmitted from a shaft by a drive cap accessible from a feed side of the outer closed end to enable release of the scroll assembly from the feed side.

26. A horizontal centrifugal scroll screen apparatus according to claim 1, wherein the outer closed end of the scroll assembly is configured to direct material to be screened from the material supply inlet to the outer inlet end of the screening assembly for screening.

27. A horizontal centrifugal scroll screen assembly according to claim 26, wherein accelerator vanes are located on the scroll assembly adjacent its outer closed end to accelerate and direct material to be screened from the material supply conduit to a screening surface of the screening assembly.

28. A centrifugal scroll screen apparatus including:

a housing;

a frusto-conical screen assembly mounted within the housing and having an inlet end and a discharge end, the screen assembly being mounted for driven rotation via a base-of-spoke piece disposed across the discharge end thereof;

a frusto-conical scroll assembly coaxially mounted for differential driven rotation within the screen assembly and including a closed end in the proximity of the inlet end of the screen assembly and being adapted to direct material to be screened from a material supply conduit to the inlet end of the screen assembly for screening and conveyance to an outlet provided in the base-of-spoke piece; and a distributor located on the closed end of the scroll assembly and being configured to direct material to be screened from the material supply inlet to the inlet end of the screening assembly for screening.

29. A centrifugal scroll screen assembly according to claim 28, wherein the distributor includes accelerator vanes located on the scroll assembly adjacent its closed end to accelerate and direct material to be screened from the material supply conduit to a screening surface of the screening assembly.

30. A centrifugal scroll screen assembly according to claim 29, wherein the inlet end and discharge end of the screen assembly respectively constitute an outer end and inner end of the screen assembly, and wherein the closed end of the scroll assembly that is in the proximity of the inlet end of the screen assembly constitutes an outer end of the scroll assembly.

31. A centrifugal scroll screen apparatus according to claim 30, wherein the housing includes a front wall adapted to close the housing, the front wall supporting the material supply conduit through an aperture located in the front wall.

32. A centrifugal scroll screen apparatus according to claim 31, wherein the front wall is hinged to provide sequential access to the screen assembly and scroll assembly.

33. A centrifugal scroll screen apparatus according to claim 32, wherein the housing and the front wall are configured such that the screen assembly and scroll assembly can be withdrawn through an opening closed by the front wall.

* * * * *